(12) United States Patent  
Matsuoka et al.

(10) Patent No.: US 7,705,902 B2  
(45) Date of Patent: Apr. 27, 2010

(54) VIDEO SIGNAL PROCESSING APPARATUS, IMAGE DISPLAY CONTROL METHOD, STORAGE MEDIUM, AND PROGRAM

(75) Inventors: Masaaki Matsuoka, Tokyo (JP); Yoshihiro Honma, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1804 days.

(21) Appl. No.: 10/430,047

(22) Filed: May 6, 2003

(65) Prior Publication Data

US 2003/0210338 A1    Nov. 13, 2003

(30) Foreign Application Priority Data

May 7, 2002    (JP)    ............................. 2002-131395

(51) Int. Cl.
*H04N 5/222*    (2006.01)
*G09G 5/399*    (2006.01)
(52) U.S. Cl. ............................. 348/333.01; 348/220.1; 348/231.99; 345/539; 345/544; 345/545; 345/546; 345/547
(58) Field of Classification Search ............ 348/333.01; 345/539, 544, 545, 556
See application file for complete search history.

(56) References Cited

U.S. PATENT DOCUMENTS

| | | | | |
|---|---|---|---|---|
| 5,420,630 | A * | 5/1995 | Takei ..................... | 348/223.1 |
| 5,543,824 | A * | 8/1996 | Priem et al. ................. | 345/539 |
| 6,122,435 | A * | 9/2000 | Izawa et al. .................. | 386/95 |
| 6,204,879 | B1 * | 3/2001 | Koseki et al. ............ | 348/230.1 |
| 6,271,866 | B1 * | 8/2001 | Hancock et al. ............. | 345/544 |
| 6,304,297 | B1 * | 10/2001 | Swan ........................ | 348/556 |

(Continued)

FOREIGN PATENT DOCUMENTS

JP    05241543 A    *    9/1993

(Continued)

OTHER PUBLICATIONS

Office Action dated Feb. 7, 2006, corresponding to Japanese Patent Application No. 2002-131395.

(Continued)

*Primary Examiner*—Lin Ye
*Assistant Examiner*—Temitope Adeyiga
(74) *Attorney, Agent, or Firm*—Cowan, Liebowitz & Latman, P.C.

(57) ABSTRACT

A video signal processing apparatus includes two image display memory areas 22 and 24 which alternately repeat input and output operations by receiving a signal obtained by performing predetermined processing for an output image signal from an image sensor 12, an image display unit 28 for displaying an object image represented by image frames sequentially output from the two memory areas, a system controller 40 which, when an image frame is to be input to one of the two memory areas, causes the other one of the two memory areas to output a held image frame, and causes the two memory areas to alternately repeat the input and output operations, thereby switching inputting and outputting of the two memory areas, and a mode determination circuit 272 for determining whether the frame rate of the output image signal from the image sensor 12 is higher or lower than the image display rate of the image display unit 28. On the basis of the determination result, the system controller 40 changes input/output control for the two memory areas.

6 Claims, 12 Drawing Sheets

U.S. PATENT DOCUMENTS

| | | | |
|---|---|---|---|
| 6,307,565 B1 * | 10/2001 | Quirk et al. | 345/554 |
| 6,466,193 B1 * | 10/2002 | Anai | 345/99 |
| 6,657,637 B1 * | 12/2003 | Inagaki et al. | 345/629 |
| 6,831,634 B1 | 12/2004 | Shigeta | |
| 6,977,673 B1 * | 12/2005 | McKain et al. | 348/207.99 |
| 7,015,965 B2 | 3/2006 | Asada | |
| 2002/0154658 A1 * | 10/2002 | Song | 370/503 |
| 2003/0156639 A1 * | 8/2003 | Liang | 375/240.01 |

FOREIGN PATENT DOCUMENTS

| | | |
|---|---|---|
| JP | 8149435 | 6/1996 |
| JP | A 9-69971 | 3/1997 |
| JP | A 2000-29452 | 1/2000 |
| JP | 2000/253280 | 9/2000 |
| JP | A 2000-284744 | 10/2000 |
| JP | 2002-10129 | 1/2002 |

OTHER PUBLICATIONS

English Abstract of JPA 2000-284744.
English Abstract of JPA 9-69971.
English Abstract of JPA 2000-29452.

* cited by examiner

F I G. 1
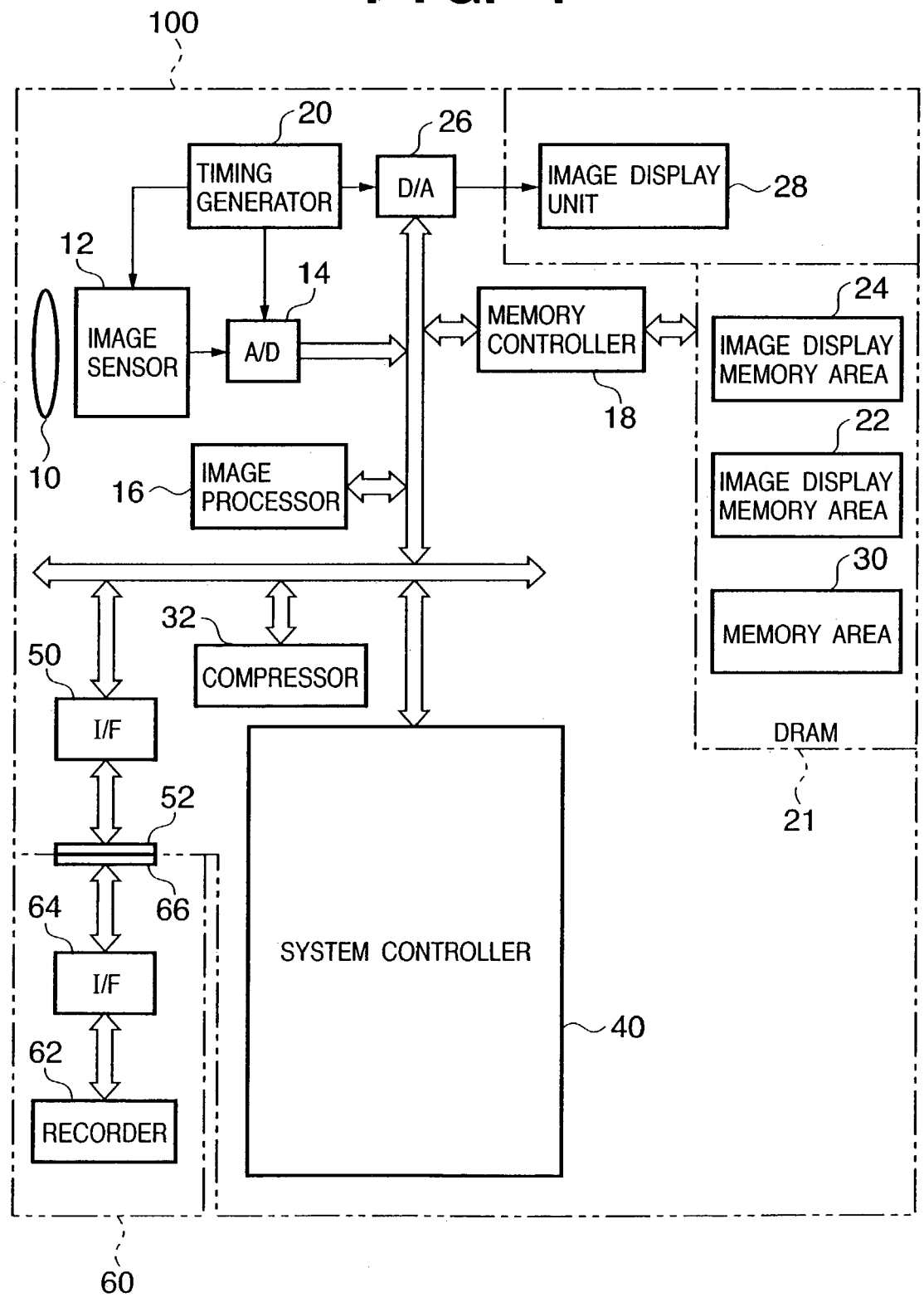

F I G. 2A
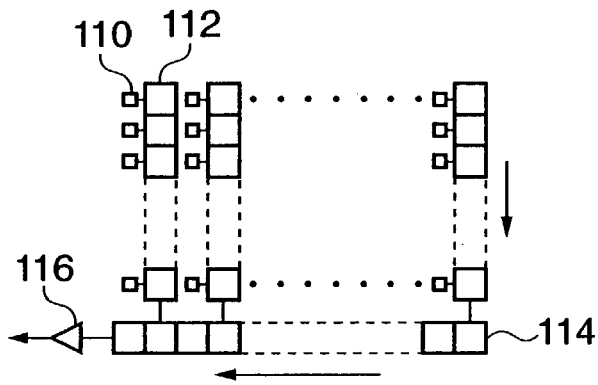
F I G. 2B
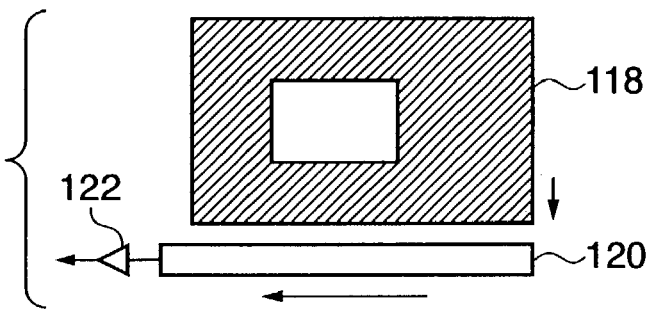
F I G. 2C
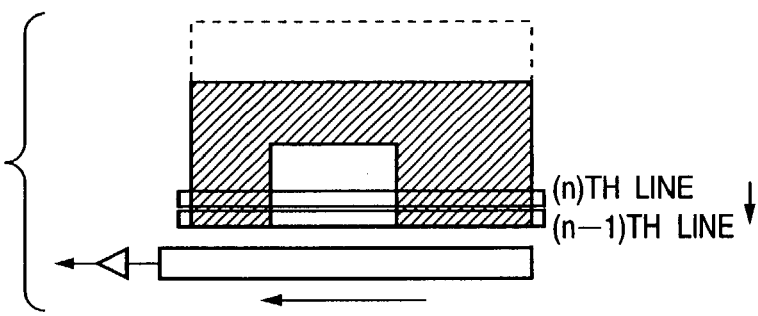
F I G. 2D
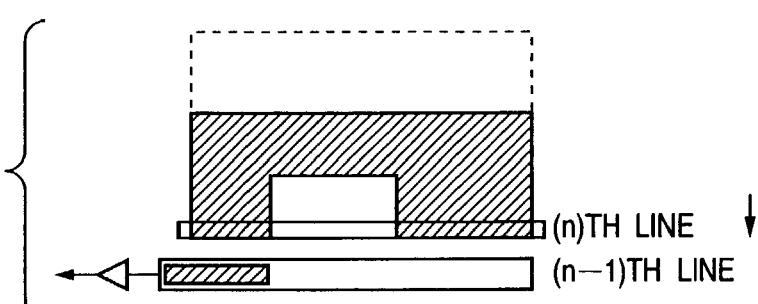
F I G. 2E
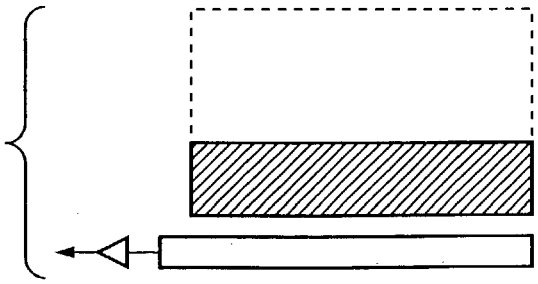

15fps

60fps

150fps

VIDEO SIGNAL PROCESSING APPARATUS, IMAGE DISPLAY CONTROL METHOD, STORAGE MEDIUM, AND PROGRAM

FIELD OF THE INVENTION

The present invention relates to a video signal processing apparatus, image display control method, storage medium, and program, and, more particularly, to a video signal processing apparatus, image display control method, storage medium, and program suitably applicable to, e.g., a digital still camera or video camera which has a liquid crystal monitor as a finder and is exclusively driven by batteries.

BACKGROUND OF THE INVENTION

First, an image sensing device described in Japanese Patent Laid-Open No. 2000-253280 will be described below as prior art. In this reference, explanation is made by using a digital still camera shown in FIG. 2 as an embodiment. In this digital still camera, an image of a desired object is sensed by a solid-state image sensor, and an image signal representing the image is converted into digital image data and recorded in a recording medium such as a memory card. The recorded image data can be read out at any arbitrary time, and the image represented by this image data can be loaded into a personal computer or the like and subjected to predetermined processing.

Some known digital still cameras of this type include a display device such as a liquid crystal monitor. In this case, as shown in FIG. 3 of the same reference, a driving signal (FIG. 3(a) of the reference) for reading out an image at a predetermined frame rate, e.g., 15 to 30 frames/sec (to be referred to as fps hereinafter) is supplied from a system controller 130 shown in FIG. 2 of the reference to an image sensor 104 shown in FIG. 2 of the reference. Accordingly, an image signal from the image sensor 104 shown in FIG. 2 of the reference is converted into digital image data by an A/D converter 106 shown in FIG. 2 of the reference. This digital image data is subjected to predetermined processing by a signal processing circuit 108 shown in FIG. 2 of the reference, and sequentially loaded into a buffer memory 114 shown in FIG. 2 of the reference via a memory controller 112 shown in FIG. 2 of the reference (FIG. 3(b) of the reference).

Then, the memory controller 112 shown in FIG. 2 of the reference sequentially reads out the image data loaded into the buffer memory 114 shown in FIG. 2 of the reference, and supplies the readout data to a video playback circuit 112 shown in FIG. 2 of the reference. Consequently, images supplied field by field from the video playback circuit 112 shown in FIG. 2 of the reference are sequentially displayed on a liquid crystal monitor 124 shown in FIG. 2 of the reference (FIG. 3(c) of the reference).

A user frames an image of an object by using this digital viewfinder function. To set photographing conditions, e.g., exposure compensation and a shutter speed, the user turns on a menu display switch of operation switches 126 shown in FIG. 2 of the reference to display an operation menu on the liquid crystal monitor 124 shown in FIG. 2 of the reference, and inputs the photographing conditions.

While this operation menu is displayed, the image sensing device described in the reference delays the driving signal to the image sensor (FIG. 4(a) of the reference) or intermittently loads image frames from the image sensor (FIG. 5(b) of the reference). In this manner, the image sensing device reduces the number of image frames to be loaded from the image sensor and lowers the frame rate of an image to be displayed, thereby reducing the battery consumption and improving the ease with which display characters are seen.

As another prior art, an image data processing apparatus described in Japanese Patent Laid-Open No. 8-149435 will be explained below. An embodiment of this reference is a television telephone system shown in FIG. 1 of the reference. The network transmission capability of this system is not sufficiently high. Therefore, as shown in FIG. 1 of the same reference, a signal of a video camera VC is converted into a digital signal by an A/D converter ADC. After that, this digital signal is subjected to a compression/filtering process by an image data compressor VDCP and transferred across a network via a line driver LD.

In the image data compression/filtering process, an image signal is processed frame by frame, and an image to be processed is divided into blocks each having a predetermined number of pixels having a horizontal or vertical spread. Therefore, this process requires a relatively long time before the processing result is determined. Accordingly, the system has image memories (buffer memories described in Japanese Patent Laid-Open No. 2000-253280) VRAM1 and VRAM2 (FIG. 2 of the reference) each capable of storing one image frame subjected to image processing such as compression and filtering. When one of these image memories receives an image frame which is output after being processed, the other image memory outputs an immediately preceding processed image frame, and the two memories alternately repeat these input and output operations (FIG. 3 of the reference).

Image data transmitted across the network is subjected to a receiving process which is the reverse of transmission, i.e., decoded and D/A-converted via a line receiver LR and displayed on a television monitor TV. A synchronous signal of an image data processor VDP is extracted by and output from an image controller VCTRL. Similar to the image data compressor VDCP, an image data decoder VDRS is constructed by using two image memories. These two image memories VRAM1 and VRAM2 may also be implemented by one dual-port image memory DPVRAM (FIG. 4 of the reference) capable of storing two processed image frames.

This television telephone system realizes image processing which is apparently performed frame by frame in real time, and thereby displays motion images on a television monitor, with an inexpensive arrangement having only an image memory area for two processed image frames.

Unfortunately, the above prior art references have the following problems. For example, to clearly photograph the motion of a rapidly moving object such as in sports, a motion image is recorded at the frame rate of image sensing. Therefore, this image sensing frame rate must be increased.

When the image sensing frame rate is made higher than the display rate, the following problem arises if the buffer memories are controlled by the means of the prior art described in Japanese Patent Laid-Open No. 2000-253280. That is, in this reference, sensed image frames are sequentially displayed. Therefore, if the image sensing frame rate is lower than the display rate, image frames can be displayed at the image sensing frame rate. However, if the image sensing frame rate becomes higher than the display rate, no image frames can be expressed. In this case, therefore, even though the frame interval of image sensing is smaller than the interval of display update, display is updated once for one sensed image frame, resulting in a digital viewfinder slower than an actual motion. Furthermore, the buffer memories are finite, and sensed image frames can be buffered more faster than when they are displayed. Consequently, an image frame is overwritten while it is displayed, or an image frame which cannot be displayed is generated.

Also, when the image sensing frame rate is made higher than the display rate, the following problem arises if the image memories are controlled by the means of the prior art described in Japanese Patent Laid-Open No. 8-149435. That is, in this reference, the input and output image memories are switched for each frame. Accordingly, information in the image memories breaks if inputting and outputting are not synchronized.

SUMMARY OF THE INVENTION

The present invention has been made in consideration of the above situation, and has as its first object to provide a video signal processing apparatus, image display control method, storage medium, and program capable of realizing a digital viewfinder while recording motion images at an image sensing frame rate even if this image sensing frame rate exceeds a display rate.

The present invention has been made in consideration of the above situation, and has as its second object to provide a video signal processing apparatus, image display control method, storage medium, and program capable of reducing the battery consumption by updating only an image frame to be displayed, when an image sensing frame rate exceeds a display rate.

The present invention has been made in consideration of the above situation, and has as its third object to provide a video signal processing apparatus, image display control method, storage medium, and program capable of realizing a digital viewfinder while recording motion images at an image sensing frame rate regardless of whether the image sensing frame rate is lower than or higher than a display rate.

To achieve the above objects, the present invention is a video signal processing apparatus including an image sensor for outputting an image signal corresponding to an object image, comprising at least two image display memory areas which alternately repeat input and output operations upon receiving a signal obtained by performing predetermined processing for an output image signal from the image sensor, display means for displaying an object image represented by image frames sequentially output from the two image display memory areas, control means which, when an image frame is to be input to one of the two image display memory areas, causes the other one of the two image display memory areas to output a held image frame, and causes the two image display memory areas to alternately repeat the input and output operations, thereby switching inputting and outputting of the two image display memory areas, and determining means for determining whether a frame rate of the output image signal from the image sensor is higher or lower than an image display rate of the display means, characterized in that the control means changes input/output control for the two image display memory areas on the basis of a result of determination by the determining means.

The present invention is an image display control method executed by a video signal processing apparatus including an image sensor for outputting an image signal corresponding to an object image, comprising a display step of displaying on display means an object image represented by image frames sequentially output from at least two image display memory areas which alternately repeat input and output operations upon receiving a signal obtained by performing predetermined processing for an output image signal from the image sensor, a control step which, when an image frame is to be input to one of the two image display memory areas, causes the other one of the two image display memory areas to output a held image frame, and causes the two image display memory areas to alternately repeat the input and output operations, thereby switching inputting and outputting of the two image display memory areas, and a determination step of determining whether a frame rate of the output image signal from the image sensor is higher or lower than an image display rate of the display means, characterized in that the control step comprises changing input/output control for the two image display memory areas on the basis of a result of determination in the determination step.

The present invention is a computer-readable storage medium storing a program of an image display control method applied to a video signal processing apparatus including an image sensor for outputting an image signal corresponding to an object image, characterized in that the image display control method comprises a display step of displaying on display means an object image represented by image frames sequentially output from at least two image display memory areas which alternately repeat input and output operations upon receiving a signal obtained by performing predetermined processing for an output image signal from the image sensor, a control step which, when an image frame is to be input to one of the two image display memory areas, causes the other one of the two image display memory areas to output a held image frame, and causes the two image display memory areas to alternately repeat the input and output operations, thereby switching inputting and outputting of the two image display memory areas, and a determination step of determining whether a frame rate of the output image signal from the image sensor is higher or lower than an image display rate of the display means, and the control step comprises changing input/output control for the two image display memory areas on the basis of a result of determination in the determination step.

The present invention is a program to be supplied to a video signal processing apparatus including an image sensor for outputting an image signal corresponding to an object image, comprising a display step of displaying on display means an object image represented by image frames sequentially output from at least two image display memory areas which alternately repeat input and output operations upon receiving a signal obtained by performing predetermined processing for an output image signal from the image sensor, a control step which, when an image frame is to be input to one of the two image display memory areas, causes the other one of the two image display memory areas to output a held image frame, and causes the two image display memory areas to alternately repeat the input and output operations, thereby switching inputting and outputting of the two image display memory areas, and a determination step of determining whether a frame rate of the output image signal from the image sensor is higher or lower than an image display rate of the display means, characterized in that the control step comprises changing input/output control for the two image display memory areas on the basis of a result of determination in the determination step.

As described above, the video signal processing apparatus of the present invention comprises at least two image display memory areas which alternately repeat input and output operations upon receiving a signal obtained by performing predetermined processing for an output image signal from an image sensor, display means for displaying an object image represented by image frames sequentially output from the two image display memory areas, control means which, when an image frame is to be input to one of the two image display memory areas, causes the other one of the two image display memory areas to output a held image frame, and causes the two image display memory areas to alternately repeat the input and output operations, thereby switching inputting and outputting of the two image display memory areas, and determining means for determining whether the frame rate of the output image signal from the image sensor is higher or lower than the image display rate of the display means. The control means changes input/output control for the two image display memory areas on the basis of the result of determination by the determining means. Accordingly, the following effects are achieved.

Conventionally, no apparatus has been proposed which realizes a digital viewfinder while recording motion images at a high frame rate exceeding a display rate. In the present invention, however, even when the image sensing frame rate exceeds the display rate, a digital viewfinder can be realized while motion images are recorded at the image sensing frame rate.

Also, in the present invention, the buttery consumption can be reduced by updating only image frames to be displayed, when the image sensing frame rate exceeds the display rate.

Furthermore, in the present invention, regardless of whether the image sensing frame rate is lower than or higher than the display rate, a digital viewfinder can be realized while motion images are recorded at the image sensing frame rate.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 1 is a block diagram showing the arrangement of a video signal processing apparatus according to the first embodiment of the present invention;

FIGS. 2A to 2E are views for explaining driving of an image sensor according to the first embodiment, in which FIG. 2A is a view showing the arrangement of the image sensor and FIGS. 2B to 2E are views showing the driving sequence of the image sensor;

FIGS. 9A to 9C are views for explaining that the frame rate of an image sensor according to the third embodiment is changed step by step from a low speed to a high speed, in which FIG. 9A is a view showing the state in which the frame rate is 15 fps, FIG. 9B is a view showing the state in which the frame rate is 60 fps, and FIG. 9C is a view showing the state in which the frame rate is 150 fps;

DETAILED DESCRIPTION OF THE PREFERRED EMBODIMENTS

Figure 3:
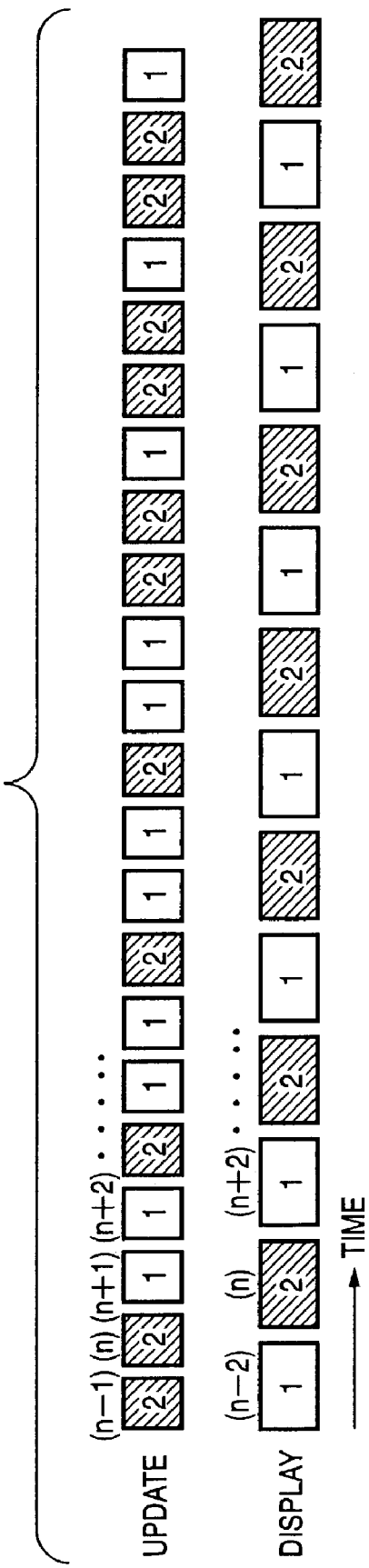
FIG. 3 is a view for explaining that a perfect digital viewfinder is realized by the first embodiment even when the frame rate of image sensing is higher than the display rate of the digital viewfinder.

First, an outline of an embodiment of the present invention will be described below. This embodiment realizes a video signal processing apparatus such as a digital still camera or video camera capable of preventing an incomplete image frame from being displayed in a digital viewfinder when the frame rate of image sensing is faster than the rate of display.

When the frame rate of an output image signal from an image sensor is higher than the image display rate of an image display unit, a video signal processing apparatus of this embodiment switches inputting and outputting of two image display memory areas in accordance with the image display frame switching timing of the image display unit, thereby preventing an incomplete image frame from being displayed in a digital viewfinder.

Also, upon detecting that image frames are continuously input twice or more to one of the two image display memory areas when the frame rate of an output image signal from the image sensor is higher than the image display rate of the image display unit, the video signal processing apparatus of this embodiment stops inputting to this image display memory area, and, after the other image display memory area completely outputs a held image frame, restarts inputting of an image frame to the other image display memory area, thereby reducing the buffer consumption.

Additionally, the video signal processing apparatus of this embodiment determines whether the frame rate of an output image signal from the image sensor is higher than or lower than the image display rate of the image display unit, and, on the basis of the determination result, changes input/output control of the two image display memory areas. In this way, the video signal processing apparatus prevents an incomplete image frame from being displayed in a digital viewfinder regardless of whether the frame rate of an output image signal from the image sensor is higher than or lower than the image display rate of the image display unit.

Furthermore, upon determining that the frame rate of an output image signal from the image sensor is higher than the image display rate of the image display unit, the video signal processing apparatus of this embodiment performs control as described above. Upon determining that the frame rate of an output image signal from the image sensor is lower than the image display rate of the image display unit, the video signal processing apparatus switches inputting and outputting of the two image display memory areas in accordance with the image frame output timing of the image sensor. In this manner, the video signal processing apparatus prevents an incomplete image frame from being displayed in a digital viewfinder.

Video signal processing apparatuses according to the first to third embodiments of the present invention will be described in detail below with reference to the accompanying drawings.

First Embodiment

FIG. 1 is a block diagram showing the arrangement of a video signal processing apparatus according to the first embodiment of the present invention. Referring to FIG. 1, a video signal processing apparatus 100 such as a digital still camera includes a photographing lens 10, image sensor 12, A/D converter 14, image processor 16, memory controller 18, timing generator 20, DRAM 21, D/A converter 26, image display unit 28, compressor 32, system controller 40, interface 50, and connector 52. Reference numeral 60 denotes a recording medium.

The photographing lens 10 inputs an optical image of an object. The image sensor 12 converts this optical image into an electrical signal. The A/D converter 14 converts the analog signal output from the image sensor 12 into a digital signal. The image processor 16 includes an image sensing signal processing circuit and resizing circuit. The image sensing signal processing circuit forms a luminance signal by performing color carrier removal, aperture correction, gamma processing, and the like for the output data from the A/D converter 14, and simultaneously forms a color difference signal by performing color compensation, matrix conversion, gamma processing, gain adjustment, and the like for the output data, thereby forming YUV video data. The resizing circuit resizes this image data from the image sensing signal processing circuit into a desired size. The memory controller 18 controls image display memory areas 22 and 24 and a memory area 30 of the DRAM 21. The timing signal generator 20 supplies a clock signal and control signal to the image sensor 12, A/D converter 14, and D/A converter 26. The timing signal generator 20 is controlled by the system controller 40.

The data from the A/D converter 14 is written in the image display memory areas 22 and 24 or memory area 30 of the DRAM 21 via the image processor 16 and memory controller 18 or via the memory controller 18 alone. The DRAM 21 is a memory which implements the image display memory areas 22 and 24 and memory area 30. The DRAM 21 is also used as a work area of the system controller 40. The image display memory areas 22 and 24 of the DRAM 21 store image data. The D/A converter 26 performs digital-to-analog conversion for the image data. The image display unit 28 is a television monitor or a similar liquid crystal monitor.

An output image signal from the image sensor 12 is input to the image processor 16 via the A/D converter 14. Image data processed by the image processor 16 is sequentially input to the image display memory areas 22 and 24 of the DRAM 21 via the memory controller 18. A digital viewfinder is realized by sequentially displaying this image data on the image display unit 28 via the D/A converter 26. However, the present invention is not limited to this means. It is also possible to once store the A/D-converted image data in the image display memory areas 22 and 24 of the DRAM 21, and output the stored image data to the image display unit 28 via the image processor 16 and D/A converter 26.

The memory area 30 of the DRAM 21 stores photographed motion images and the like, and has an enough storage capacity to store motion images and the like for a predetermined time. These motion images and the like can be exchanged between the memory area 30 of the DRAM 21 and the recording medium 60. The compressor 32 compresses image data by, e.g., adaptive discrete cosine transform (ADCT). The compressor 32 loads image data from the memory area 30 of the DRAM 21 or directly from the image processor 16, compresses the loaded image data, and writes the compressed data in the memory area 30 of the DRAM 21. The compressor 32 has a raster-block conversion function of receiving an image signal in raster sequence and generating a block-sequential image signal having a desired block size, and a block compressing function of receiving and compressing the block-sequential image signal.

In this embodiment, an output image signal from the image sensor 12 is input to the image processor 16 via the A/D converter 14. This image data processed by the image processor 16 is compressed by the compressor 32, and the compressed data is stored in the memory area 30 of the DRAM 21 via the memory controller 18. In this manner, a motion image is recorded at the frame rate of image sensing. However, the present invention is not limited to this means. The A/D-converted, processed image data may also be once stored in the memory area 30 of the DRAM 21, and then read out and compressed. Alternatively, the A/D-converted image data may be once stored in the memory area 30 of the DRAM 21, and then read out, processed, and compressed.

The system controller 40 controls the whole video signal processing apparatus 100. The system controller 40 is made up of a ROM for storing programs and the like for controlling the video signal processing apparatus 100, a CPU for executing the programs, and the like. On the basis of the programs, the system controller 40 executes processes shown in flow charts to be described later. The interface 50 interfaces with the recording medium 60 such as a memory card. The connector 52 connects the video signal processing apparatus 100 to the recording medium 60 such as a memory card.

The recording medium 60 such as a memory card has a recorder 62 which is a semiconductor memory or the like, an interface 64 which interfaces with the video signal processing apparatus 100, and a connector 66 which connects to the video signal processing apparatus 100.

In this embodiment, the image sensor 12 is an inter line type CCD. As driving methods of the image sensor 12, a method of reading out all pixels and a method of this embodiment will be explained below with reference to FIGS. 2A to 2E.

FIG. 2A is a view showing the arrangement of the image sensor 12. Photodiodes (to be referred to as PDs hereinafter) 110 store signal charge corresponding to an optical image of an object. Each individual PD forms one pixel. A method of reading out all these pixels will be described below. Signal charge is transferred from the PDs 110 to a vertical transfer register (to be referred to as a VCCD hereinafter) 112. The stored charge is vertically transferred line by line to a horizontal transfer register (to be referred to as an HCCD hereinafter) 114, and horizontally transferred line by line. The stored charge transferred by the horizontal register 114 is loaded pixel by pixel into an output amplifier 116 and output pixel by pixel as a voltage signal. An image sensor having 1,000,000 to 2,000,000 pixels can realize an image sensing frame rate of 15 to 30 fps.

FIGS. 2B to 2E are views showing the driving sequence of the image sensor 12 according to this embodiment. Reference numeral 118 collectively indicates the PDs and VCCD. Assume that signal charge is already transferred from the PDs to the VCCD in this state. Reference numeral 120 denotes the HCCD; and 122, the output amplifier. In this embodiment, only a central blank rectangle of 118 is read out. A portion below this blank rectangle is unnecessary, so this portion need not be transferred line by line to the HCCD. Therefore, while an immediately preceding line is horizontally transferred to the HCCD, the next line may be read out to the HCCD. Consequently, this portion can be read out at high speed (FIGS. 2B and 2C).

Lines containing the blank rectangle will be explained below with reference to FIGS. 2C and 2D. First, an (n−1)th line is read out to the HCCD and horizontally transferred. When by this horizontal transfer a gray unnecessary portion on the right of the (n−1)th line comes to a position where this line does not overlap a blank necessary portion of an (n)th line as shown in FIG. 2C, this (n)th line is read out to the horizontal transfer register. In this manner, it is possible to overlay only unnecessary portions without destroying a necessary portion by an adjacent line, and read out this portion at high speed. An unnecessary portion above the blank rectangle remains in a form as shown in FIG. 2E. Since an unnecessary portion of the next frame also comes to the position of this portion, the read rate can be increased by reading out the next frame to the VCCD in this state.

When the above means is used, an image sensing frame rate of about 100 to 150 fps can be realized by reading out pixels about 1/16 of all pixels by an image sensor having about 1,000,000 to 2,000,000 pixels. However, the present invention is not limited to this means. This high frame rate may also be realized by increasing the rate of a clock to be supplied to the image sensor 12.

In this embodiment as described above, the image sensing frame rate is about 100 to 150 fps, and the image display unit 28 is a television monitor or similar liquid crystal monitor having a display rate of about 60 fields/sec. A method of displaying a digital viewfinder in this embodiment will be explained below with reference to FIG. 3.

Referring to FIG. 3, rectangles denoted by 1 and 2 are two image display memory areas. Each number in the parentheses above a rectangle represents the order of sensed image data. When sensed image data is input to image display memory area 2, image data held in image display memory area 1 is output to the image display unit 28 via the D/A converter 26. These inputting and outputting are alternately performed. Since this switching between inputting and outputting is performed at the display rate of the image display memory areas, an image display memory area currently being updated is not displayed. In FIG. 3, some updated image display memory areas are displayed midway along the process. In this case, however, update always leads display and is faster than display, so no image display memory area currently being updated is displayed.

Figure 4:
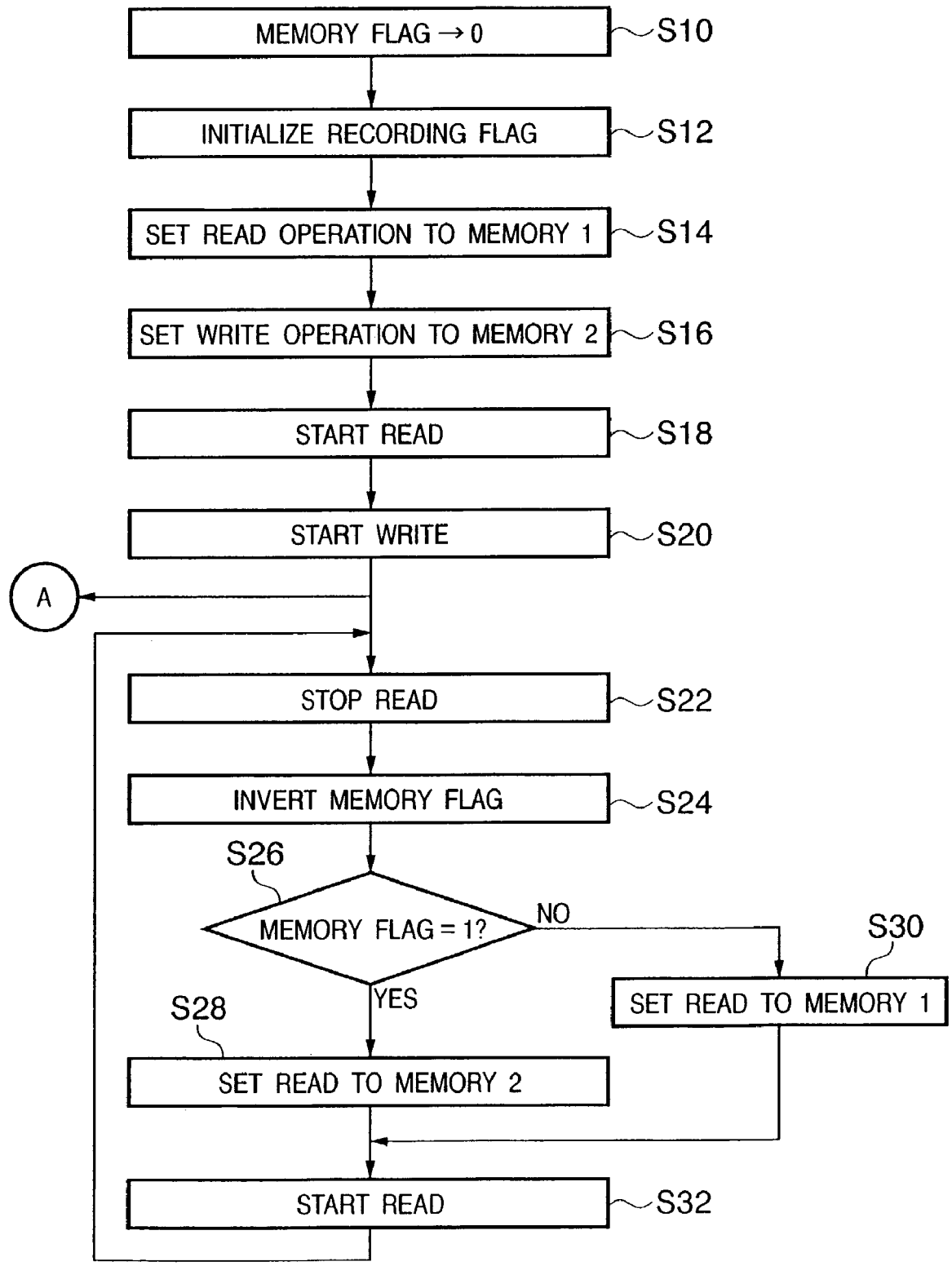
FIG. 4 is a flow chart showing a process by which a CPU of a system controller according to the first embodiment executes a digital viewfinder function and motion image recording function.
Figure 5:
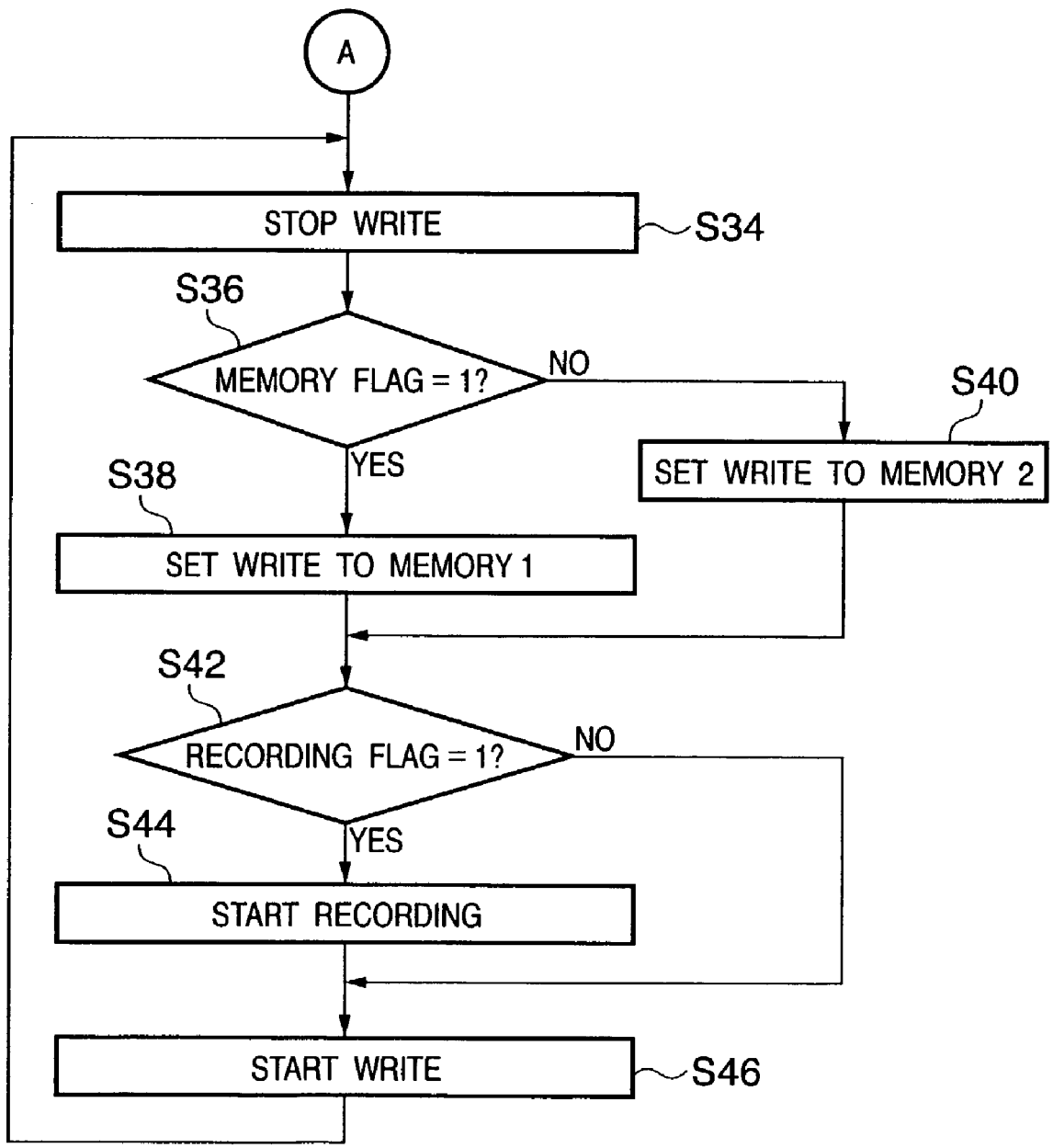
FIG. 5 is a flow chart showing the process by which the CPU of the system controller according to the first embodiment executes the digital viewfinder function and motion image recording function.

The operation of the video signal processing apparatus 100 of the first embodiment having the above arrangement will be described in detail below. In the first embodiment, the flows of those processes pertaining to a digital viewfinder function and motion picture recording function, which are executed by the CPU of the system controller 40 of the video signal processing apparatus 100 will be explained with reference to FIGS. 4 and 5.

First, the CPU of the system controller 40 initializes a memory flag. The initial value of this memory flag is 0 (step S10). Next, the CPU initializes a recording flag (step S12). When this recording flag is 0, no motion image recording is performed; when the recording flag is 1, motion image recording is performed. The memory flag designates initial memories for read and write (steps S14 and S16). That is, when the memory flag is 1, memory 1 is a read memory, and memory 2 is a write memory. Note that these two memories correspond to the image display memory areas 22 and 24. When the memory flag is 1, the read and write memories are switched. Then, read and write are started (steps S18 and S20).

First, write is completed (step S34). Since the memory flag is not updated, data is again written in the same memory 2 (steps S36, S40, and S46). When this process is repeated several times, read from memory 1 is complete (step S22). The memory flag is updated (step S24), so the read and write memories are switched. More specifically, read memory switching (memory 1→memory 2) is performed immediately after the memory flag is updated (steps S26, S28, and S32). Write memory switching (memory 2→memory 1) is performed after a frame currently being written is completely written (steps S34, S36, S38, and S46).

In this state, the write and read operations temporarily access the same memory. However, since the write operation leads the read operation and is faster than the read operation, no data is incompletely read out from either memory. When write and read are thus alternately repeated, no image frame is displayed from a memory in an incomplete state. To record motion images, the recording flag is set to 1 at an arbitrary timing. In this case, motion image recording is started when write is complete immediately after the recording flag is set to 1 (steps S42 and S44).

As described above, the first embodiment of the present invention can provide a digital viewfinder by sequentially displaying sensed image data on a television monitor or similar liquid crystal monitor having a display rate of 60 fields/sec, when the image sensing frame rate is about 100 to 150 fps, and can also record motion images at this image sensing frame rate. The image sensing frame rate and display rate are substantially relative to each other. Accordingly, the image sensing frame rate may also be higher than 150 fps, and the display device may also be a liquid crystal monitor which displays at 30 fields/sec.

Second Embodiment

Similar to the first embodiment, a video signal processing apparatus 100 such as a digital still camera according to the second embodiment of the present invention includes a photographing lens 10, image sensor 12, A/D converter 14, image processor 16, memory controller 18, timing generator 20, DRAM 21, D/A converter 26, image display unit 28, compressor 32, system controller 40, interface 50, and connector 52 (FIG. 1). Details of these components are explained in the first embodiment, so a description thereof will be omitted.

Figure 6:
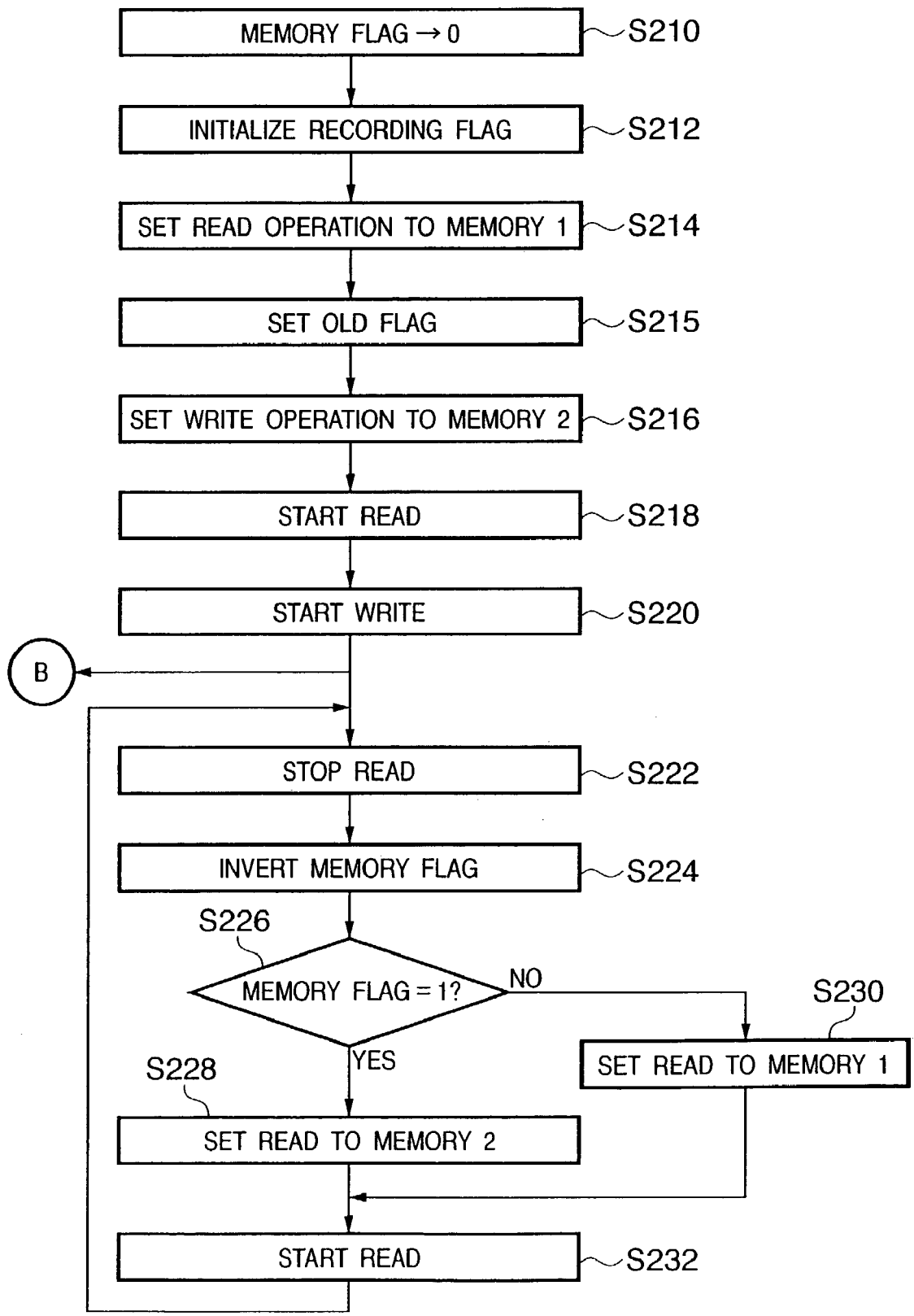
FIG. 6 is a flow chart showing a process by which a CPU of a system controller according to the second embodiment of the present invention executes a digital viewfinder function and motion image recording function.
Figure 7:
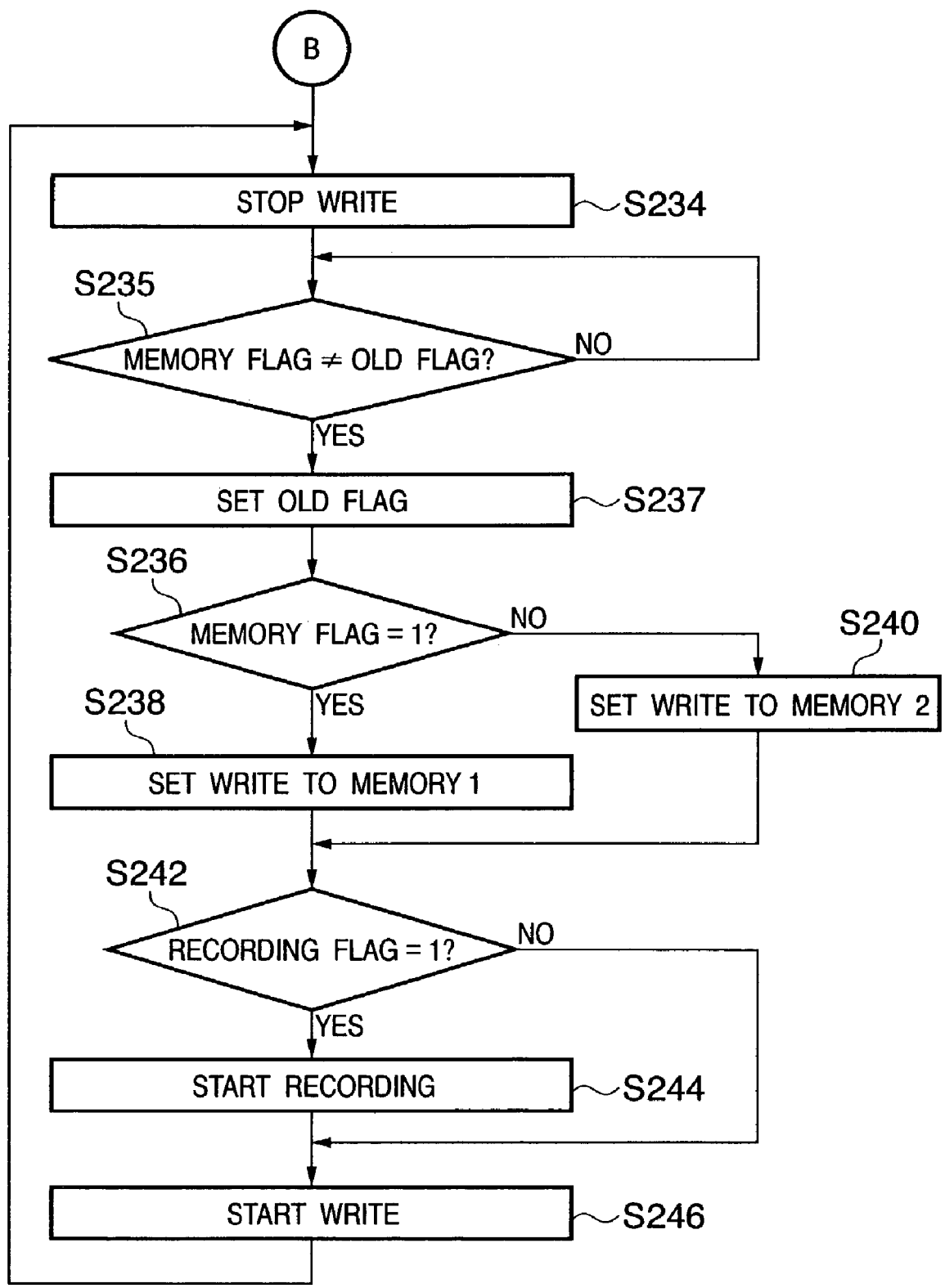
FIG. 7 is a flow chart showing the process by which the CPU of the system controller according to the second embodiment executes the digital viewfinder function and motion image recording function.

The operation of the video signal processing apparatus 100 of the second embodiment having the above arrangement will be described in detail below. In the second embodiment, the flows of those processes pertaining to a digital viewfinder function and motion picture recording function, which are executed by a CPU of the system controller 40 of the video signal processing apparatus 100 will be explained with reference to FIGS. 6 and 7.

First, the CPU of the system controller 40 initializes a memory flag. The initial value of this memory flag is 0 (step S210). Next, the CPU initializes a recording flag (step S212). When this recording flag is 0, no motion image recording is performed; when the recording flag is 1, motion image recording is performed. The memory flag designates initial memories for read and write (steps S214 and S216). That is, when the memory flag is 0, memory 1 is a read memory, and memory 2 is a write memory. When the memory flag is 1, the read and write memories are switched. To clarify, when write is to be performed next, a memory to which immediately preceding write is executed, the corresponding memory flag is stored in an old flag before the write memory is set (step S215). Then, read and write are started (steps S218 and S220).

First, write is complete (step S234). The CPU determines whether the memory flag is updated by comparing the memory flag with the old flag (step S235). Since the memory flag is not updated, the CPU holds the write stop state. This determination is repeated at the frame rate of image sensing. When this process is repeated several times, read from memory 1 is complete (step S222). The memory flag is updated (step S224), so the read and write memories are switched. More specifically, read memory switching (memory 1→memory 2) is performed immediately after the memory flag is updated (steps S226, S228, and S232). Write memory switching (memory 2→memory 1) is performed after a frame currently being written is completely written (steps S234, S235, S237, S236, S238, and S246).

In the write operation, the CPU detects that the memory flag is updated (step S235), stores the updated memory flag in the old flag (step S237), and sets the memories. When write and read are thus alternately repeated, no image frame is displayed from a memory in an incomplete state. In addition, the battery consumption can be reduced because no unnecessary image frame is updated. To record motion images, the recording flag is set to 1 at an arbitrary timing. In this case, motion image recording is started when write is completed immediately after the recording flag is set to 1 (steps S242 and S244).

As described above, the second embodiment of the present invention can provide a digital viewfinder by sequentially displaying sensed image data on a television monitor or similar liquid crystal monitor having a display rate of 60 fields/sec, when the image sensing frame rate is about 100 to 150 fps, and can also record motion images at this image sensing frame rate. The image sensing frame rate and display rate are substantially relative to each other. Accordingly, the image sensing frame rate may also be higher than 150 fps, and the display device may also be a liquid crystal monitor which displays at 30 fields/sec. Furthermore, this embodiment reduces the battery consumption by updating only image frames to be displayed.

Third Embodiment

Figure 8:
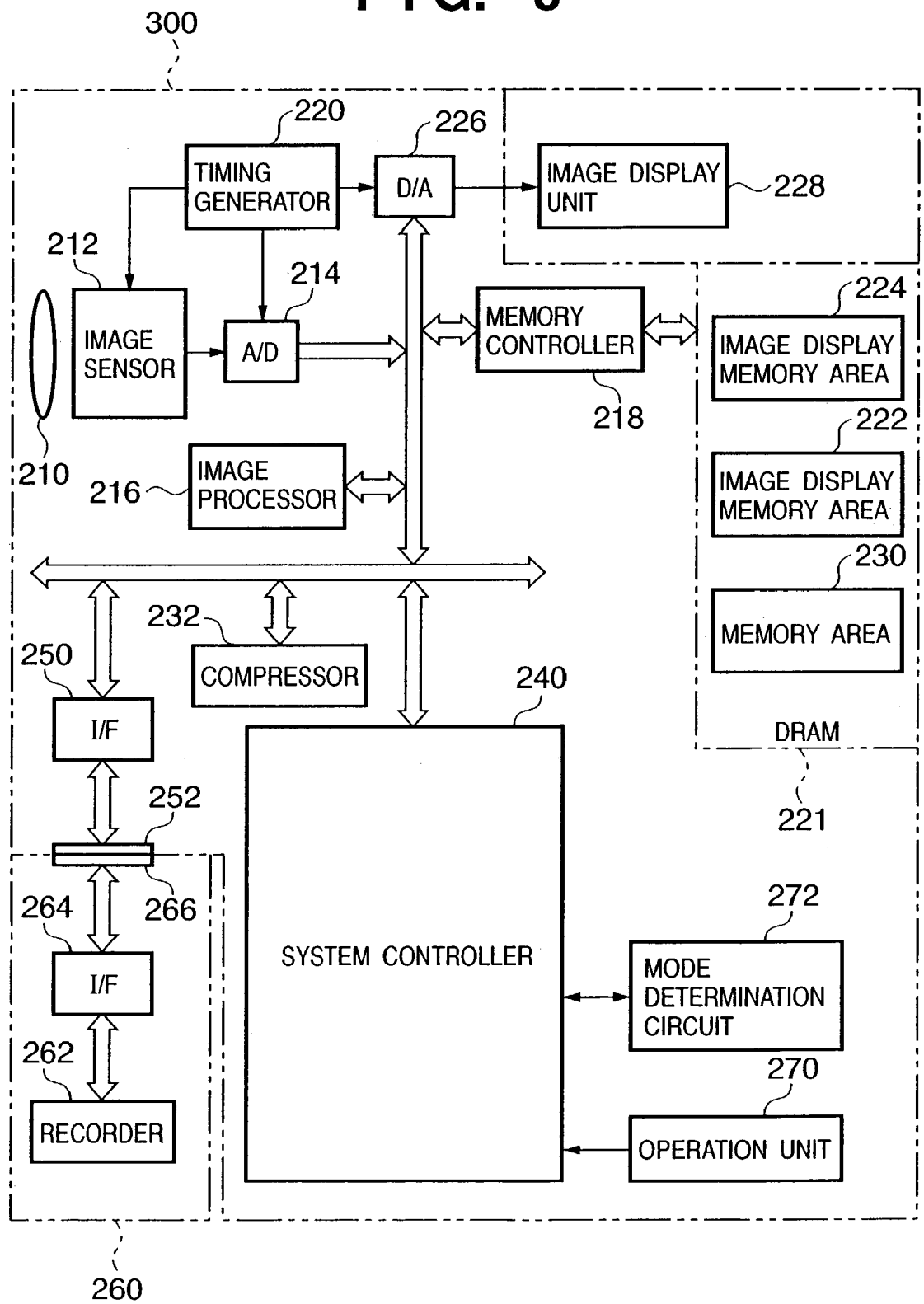
FIG. 8 is a block diagram showing the arrangement of a video signal processing apparatus according to the third embodiment of the present invention.

FIG. 8 is a block diagram showing the arrangement of a video signal processing apparatus according to the third embodiment of the present invention. Referring to FIG. 8, a video signal processing apparatus 300 such as a digital still camera includes a photographing lens 210, image sensor 212, A/D converter 214, image processor 216, memory controller 218, timing generator 220, DRAM 221, D/A converter 226, image display unit 228, compressor 232, system controller 240, interface 250, connector 252, operation unit 270, and mode determination circuit 272. Reference numeral 260 denotes a recording medium.

The photographing lens 210 inputs an optical image of an object. The image sensor 212 converts this optical image into an electrical signal. The A/D converter 214 converts the analog signal output from the image sensor 212 into a digital signal. The image processor 216 includes an image sensing signal processing circuit and resizing circuit. The image sensing signal processing circuit forms a luminance signal by performing color carrier removal, aperture correction, gamma processing, and the like for the output data from the A/D converter 214, and simultaneously forms a color difference signal by performing color compensation, matrix conversion, gamma processing, gain adjustment, and the like for the output data, thereby forming YUV video data. The resizing circuit resizes this image data from the image sensing signal processing circuit into a desired size. The memory controller 218 controls image display memory areas 222 and 224 and a memory area 230 of the DRAM 221. The timing signal generator 220 supplies a clock signal and control signal to the image sensor 212, A/D converter 214, and D/A converter 226. The timing signal generator 220 is controlled by the system controller 240.

The data from the A/D converter 214 is written in the image display memory areas 222 and 224 or memory area 230 of the DRAM 221 via the image processor 216 and memory controller 218 or via the memory controller 218 alone. The DRAM 221 is a memory which implements the image display memory areas 222 and 224 and memory area 230. The DRAM 221 is also used as a work area of the system controller 240. The image display memory areas 222 and 224 of the DRAM 221 store image data. The D/A converter 226 performs digital-to-analog conversion for the image data. The image display unit 228 is a television monitor or a similar liquid crystal monitor.

An output image signal from the image sensor 212 is input to the image processor 216 via the A/D converter 214. Image data processed by the image processor 216 is sequentially input to the image display memory areas 222 and 224 of the DRAM 221 via the memory controller 218. A digital viewfinder is realized by sequentially displaying this image data on the image display unit 228 via the D/A converter 226. However, the present invention is not limited to this means. It is also possible to once store the A/D-converted image data in the image display memory areas 222 and 224 of the DRAM 221, and output the stored image data to the image display unit 228 via the image processor 216 and D/A converter 226.

The memory area 230 of the DRAM 221 stores photographed motion images and the like, and has an enough storage capacity to store motion images and the like for a predetermined time. These motion images and the like can be exchanged between the memory area 230 of the DRAM 221 and the recording medium 260. The compressor 232 compresses image data by, e.g., adaptive discrete cosine transform (ADCT). The compressor 232 loads image data from the memory area 230 of the DRAM 221 or directly from the image processor 216, compresses the loaded image data, and writes the compressed data in the memory area 230 of the DRAM 221. The compressor 232 has a raster-block conversion function of receiving an image signal in raster sequence and generating a block-sequential image signal having a desired block size, and a block compressing function of receiving and compressing the block-sequential image signal.

In this embodiment, an output image signal from the image sensor 212 is input to the image processor 216 via the A/D converter 214. This image data processed by the image processor 216 is compressed by the compressor 232, and the compressed data is stored in the memory area 230 of the DRAM 221 via the memory controller 218. In this manner, a motion image is recorded at the frame rate of image sensing. However, the present invention is not limited to this means. The A/D-converted, processed image data may also be once stored in the memory area 230 of the DRAM 221, and then read out and compressed. Alternatively, the A/D-converted image data may be once stored in the memory area 230 of the DRAM 221, and then read out, processed, and compressed.

The system controller 240 controls the whole video signal processing apparatus 300. The system controller 240 is made up of a ROM for storing programs and the like for controlling the video signal processing apparatus 300, a CPU for executing the programs, and the like. On the basis of the programs, the system controller 240 executes processes shown in flow charts to be described later. The interface 250 interfaces with the recording medium 260 such as a memory card. The connector 252 connects the video signal processing apparatus 300 to the recording medium 260 such as a memory card.

The recording medium 260 such as a memory card has a recorder 262 which is a semiconductor memory or the like, an interface 264 which interfaces with the video signal processing apparatus 300, and a connector 266 which connects to the video signal processing apparatus 300.

The operation unit 270 allows a user to designate, e.g., the frame rate of motion image recording. The mode determination unit 272 determines whether the frame rate of motion image recording designated via the operation unit 270, i.e., the frame rate of image sensing exceeds 60 fields/sec as a display rate.

Figure 9A:
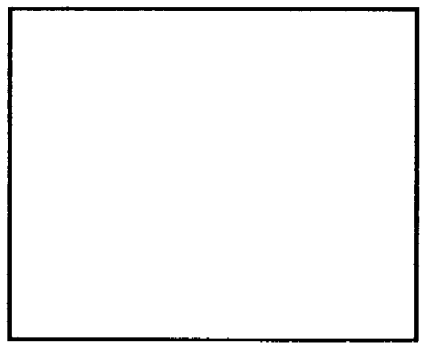
Figure 9B:
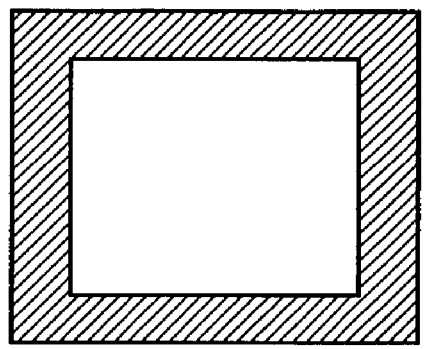
Figure 9C:
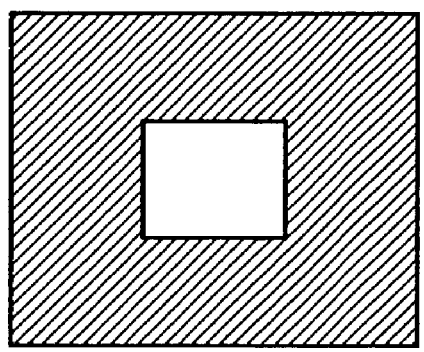

A method of driving the image sensor 212 according to this embodiment will be explained below with reference to FIGS. 9A to 9C. FIGS. 9A to 9C are views showing an outline of the image sensor 212 having 1,000,000 to 2,000,000 pixels. In each of FIGS. 9A to 9C, a blank portion indicates a region to be read out. If all pixels are read out as shown in FIG. 9A, an image signal can be read out at about 15 fps. If the read range is downsized as shown in FIGS. 9B and 9C, the image sensing frame rate can be increased step by step to 60 and 150 fps as explained in the first embodiment. However, the present invention is not limited to this means. The image sensing frame rate may also be changed step by step from a low seed to a high speed by increasing the rate of a clock to be supplied to the image sensor 212.

Figure 10:
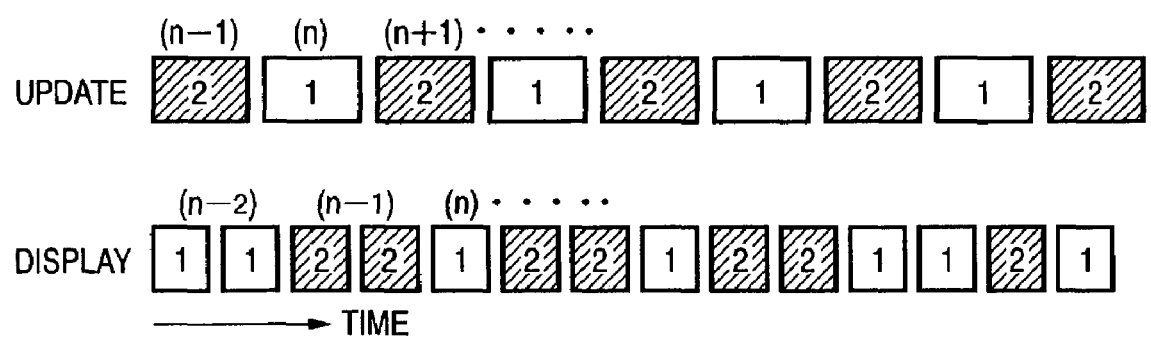
FIG. 10 is a view for explaining that a perfect digital viewfinder is realized by the third embodiment even when the frame rate of image sensing is higher than the display rate of the digital viewfinder.

In this embodiment, if the mode determination circuit 272 determines that the image sensing frame rate is lower than the display rate when the image sensing frame rate is changed, image display memory areas in a digital viewfinder are controlled as shown in FIG. 10.

Referring to FIG. 10, rectangles denoted by 1 and 2 are two image display memory areas. Each number in the parentheses above a rectangle represents the order of sensed image data. When sensed image data is input to image display memory area 2, image data held in image display memory area 1 is output to the image display unit 228 via the D/A converter 226. These inputting and outputting are alternately performed. Since this switching between inputting and outputting is performed at the image sensing frame rate of the image display memory areas, an image display memory area currently being updated is not displayed. In FIG. 10, some updated image display memory areas are displayed midway along the process. In this case, however, display always leads update and is faster than update, so no image display memory area currently being updated is displayed.

If the mode determination circuit 272 determines that the image sensing frame rate is higher than the display rate when the image sensing frame rate is changed, the image display memory areas are controlled by the method explained in the first and second embodiments. Accordingly, even when the image sensor 212 is driven within the range of about 15 to 150 fps, a digital viewfinder can be provided by sequentially displaying sensed image data on a television monitor or similar liquid crystal monitor having a display rate of 60 fields/sec, without displaying any incomplete image frames.

Figure 11:
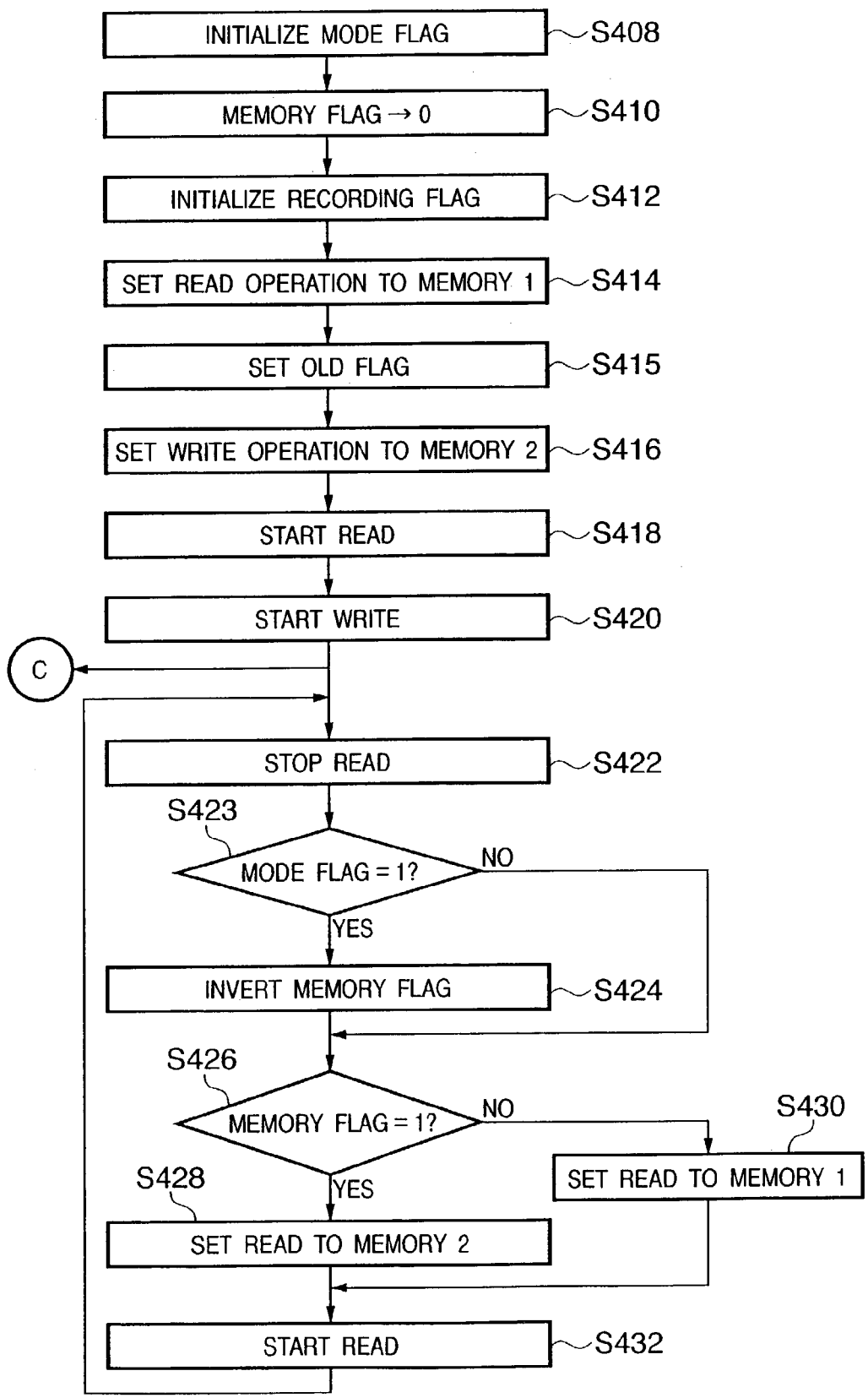
FIG. 11 is a flow chart showing a process by which a CPU of a system controller according to the third embodiment executes a digital viewfinder function and motion image recording function.
Figure 12:
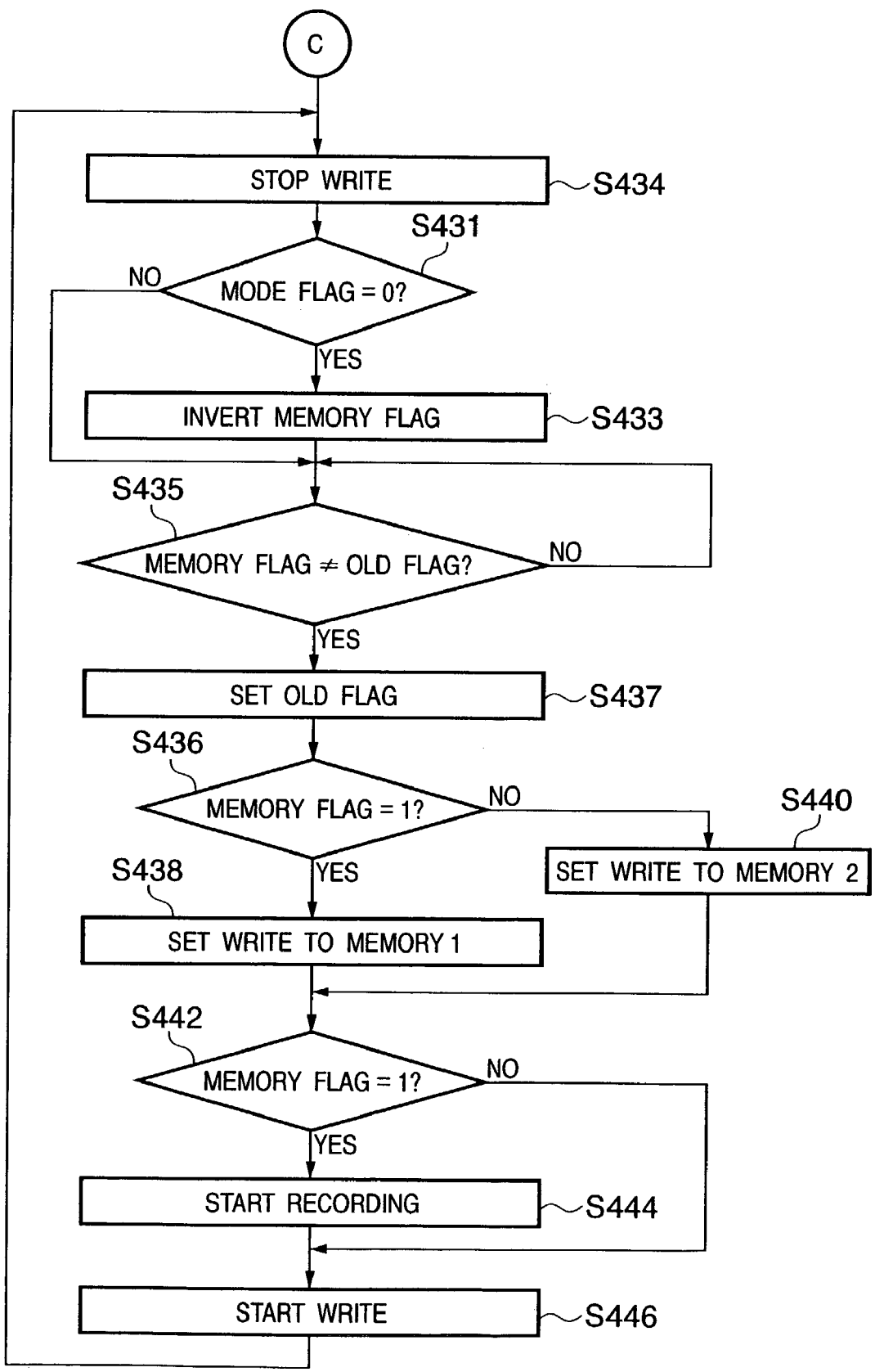
FIG. 12 is a flow chart showing the process by which the CPU of the system controller according to the third embodiment executes the digital viewfinder function and motion image recording function.

The operation of the video signal processing apparatus 300 of the third embodiment having the above arrangement will be described in detail below. In the third embodiment, the flows of those processes pertaining to a digital viewfinder function and motion picture recording function, which are executed by the CPU of the system controller 240 of the video signal processing apparatus 300 will be explained with reference to FIGS. 11 and 12.

First, the CPU of the system controller 240 initializes a mode flag (step S408). A mode flag indicates, by 0 or 1, whether the image sensing frame rate exceeds 60 fields/sec as the display rate. During the processing, this mode flag is rewritten by the mode determination circuit 272. Next, the CPU initializes a memory flag. The initial value of this memory flag is 0 (step S410). After that, the CPU initializes a recording flag (step S412). When this recording flag is 0, no motion image recording is performed; when the recording flag is 1, motion image recording is performed.

The memory flag designates initial memories for read and write (steps S414 and S416). That is, when the memory flag is 0, memory 1 is a read memory, and memory 2 is a write memory. When the memory flag is 1, the read and write memories are switched. To clarify, when write is to be performed next, a memory to which immediately preceding write is executed, the corresponding memory flag is stored in an old flag before the write memory is set (step S415). Then, read and write are started (steps S418 and S420).

A process when the mode flag is 0 and a process when the mode flag is 1 will be separately explained below. First, the process when the mode flag is 0 will be described. At the start, read is completed (step S422). Since the mode flag is 0, the memory flag is not inverted (step S423). Since the memory flag is not updated, data is read out from the same memory 1 (steps S426, S430, and S432). When this process is repeated several times, write to memory 2 is complete (step S434).

Since the mode flag is 0, the memory flag is updated (steps S431 and S433), and the read and write memories are switched. More specifically, write memory switching (memory 2→memory 1) is performed immediately after the memory flag is updated (steps S436, S438, and S446). Read memory switching (memory 1→memory 2) is performed immediately after a frame currently being read is completely read (steps S422, S423, S426, S428, and S432) (when the mode flag is 0, step S423 is always NO).

In this state, the write and read operations temporarily access the same memory. However, since the read operation leads the write operation and is faster than the write operation, no data is incompletely read out from either memory. When write and read are thus alternately repeated, no image frame is displayed from a memory in an incomplete state. To record motion images, the recording flag is set to 1 at an arbitrary timing. In this case, motion image recording is started when write is completed immediately after the recording flag is set to 1 (steps S442 and S444).

Next, the process when the mode flag is 1 will be described. First, write is completed (step S434). Since the mode flag is 1, the memory flag is not updated (step S431). The CPU determines whether the memory flag is updated by comparing the memory flag with the old flag (step S435). Since the memory flag is not updated, the CPU holds the write stop state. This determination is repeated at the frame rate of image sensing. When this process is repeated several times, read from the memory 1 is complete (step S422).

Since the mode flag is 1, the memory flag is updated (steps S423 and S424), and the read and write memories are switched. More specifically, read memory switching (memory 1 →memory 2) is performed immediately after the memory flag is updated (steps S426, S428, and S432). Write memory switching (memory 2 →memory 1) is performed after the next image frame starts being input (steps S434, S435, S437, S436, S438, and S446) (when the mode flag is 1, step S431 is always NO).

In the write operation, the CPU detects that the memory flag is updated (step S435), stores the updated memory flag in the old flag (step S437), and sets the memories. When write and read are thus alternately repeated, no image frame is displayed from a memory in an incomplete state. In addition, the battery consumption can be reduced because no unnecessary image frame is updated. To record motion images, the recording flag is set to 1 at an arbitrary timing. In this case, motion image recording is started when write is completed immediately after the recording flag is set to 1 (steps S442 and S444).

As described above, the third embodiment of the present invention can provide a digital viewfinder by sequentially displaying sensed image data on a television monitor or similar liquid crystal monitor having a display rate of 60 fields/sec, when the image sensing frame rate is about 15 to 150 fps, and can also record motion images at this image sensing frame rate. The image sensing frame rate and display rate are substantially relative to each other. Accordingly, the image sensing frame rate may also be higher than 150 fps, and the display device may also be a liquid crystal monitor which displays at, e.g., 30 fields/sec.

Other Embodiments

In each of the above embodiments, a video signal processing apparatus of the present invention is applied to a digital still camera. However, the present invention is not limited to these embodiments and also applicable to a video camera.

In each of the above embodiments, the present invention is a simple video signal processing apparatus. However, the present invention is not limited to these embodiments and also applicable to a system in which a video signal processing apparatus and an information processing apparatus such as a personal computer or portable information terminal are combined such that data can be communicated.

The present invention can be applied to a system constituted by a plurality of devices or to an apparatus comprising a single device. Further, the present invention can also be achieved by supplying a medium such as a storage medium storing program codes of software for implementing the functions of the above embodiments to a system or apparatus, and reading out and executing the program codes stored in the storage medium by a computer (or a CPU or MPU) of the system or apparatus.

In this case, the program codes read out from the storage medium implement the functions of the embodiments, and the storage medium storing these program codes constitutes the invention. As this medium such as a storage medium for supplying the program codes, it is possible to use, e.g., a floppy (registered trademark) disk, hard disk, optical disk, magnetooptical disk, CD-ROM, CD-R, magnetic tape, nonvolatile memory card, ROM, or download across a network.

Also, besides the functions of the above embodiments are implemented by executing the readout program codes by the computer, the present invention includes a case where an OS or the like running on the computer performs part or the whole of actual processing in accordance with designations by the program codes and thereby implements the functions of the above embodiments.

Furthermore, the present invention also includes a case where the program codes read out from the storage medium are written in a memory of a function extension board inserted into the computer or of a function extension unit connected to the computer, and, in accordance with designations by the program codes, a CPU or the like of the function extension board or function extension unit performs part or the whole of actual processing and thereby implements the functions of the above embodiments.

The present invention is not limited to the above embodiments and various changes and modifications can be made within the spirit and scope of the present invention. Therefore, to apprise the public of the scope of the present invention, the following claims are made.

What is claimed is:

1. An image signal processing apparatus comprising:
    a) an image sensing unit which sequentially outputs an image signal corresponding to an object image in a first frame rate;
    b) a memory having a first frame memory region and second frame memory region;
    c) a display unit which sequentially displays an image of the input image signal in a second frame rate; and
    d) a memory control unit which controls a writing operation and reading operation of said memory, wherein said memory control unit controls the memory to write the image signal which is sequentially output in the first frame rate from said image sensing unit on the first frame memory region or second frame memory region, and sequentially output the image signal read from the first frame memory region or second frame memory region to said display unit in the second rate; and
    e) a determination unit which determines whether or not the first frame rate is higher or lower than the second frame rate,
    wherein if said determination unit determines that the first frame rate is higher than the second frame rate, said memory control unit controls to repeat writing a plurality of different frame image signal on the second frame memory region as the writing operation while controls not to execute the writing operation on the first frame memory region until the reading operation from the first frame memory region is completed,
    and wherein if said determination unit determines that the first frame rate is lower than the second frame rate, said memory control unit controls to repeat reading same frame image signal from the first frame memory region as the reading operation while controls not to execute the writing operation on the second frame memory region until the writing operation on the second frame memory region is completed.

2. The apparatus according to claim 1, wherein if the writing operation on the second frame memory region is continuously executed twice or more said memory control unit controls to stop the writing operation on the second frame memory region until the reading operation from the first frame memory region is completed.

3. An image signal processing method comprising:
    a) an output step of sequentially outputting an image signal corresponding to an object image from an image sensing unit in a first frame rate;
    b) a writing step of writing the image signal sequentially output from the image sensing unit in the first frame rate on a first frame memory region or second frame memory region of a memory;
    c) a reading step of reading the image signal from the first frame memory region or second frame memory region and sequentially outputting the image signal to a display unit in a second frame rate; and
    d) a determination step of determining whether or not the first frame rate is higher or lower than the second frame rate, wherein if said determination step determines that the first frame rate is higher than the second frame rate, said writing step on the second frame memory region is repeated writing a plurality of different frame image signal on the second frame memory region while said writing step on the first frame memory region is not executed until said reading step from the first frame memory region is completed, and wherein if said determination step determines that the first frame rate is lower than the second frame rate, said reading step on the first frame memory region is repeated reading same frame image signal from the first frame memory region while said writing step on the second frame memory region is not executed until said writing step on the second frame memory region is completed.

4. The method according to claim 1, wherein if said writing step on the second frame memory region is continuously executed twice or more said writing step on the second frame memory region is stopped until said reading step from the first frame memory region is completed.

5. A computer-non-transistory-readable storage medium storing a program of an image signal processing method applied to an image signal processing apparatus including an image sensor for outputting an image signal corresponding to an object image, wherein the image signal processing method comprises: a) an output step of sequentially outputting an image signal corresponding to an object image from an image sensing unit in a first frame rate; b) a writing step of writing the image signal sequentially output from the image sensing unit in the first frame rate on a first frame memory region or second frame memory region of a memory; c) a reading step of reading the image signal from the first frame memory region or second frame memory region and sequentially outputting the image signal to a display unit in a second frame rate; and d) a determination step of determining whether or not the first frame rate is higher or lower than the second frame rate, wherein if said determination step determines that the first frame rate is higher than the second frame rate, said writing step on the second frame memory region is repeated writing a plurality of different frame image signal on the second frame memory region while said writing step on the first frame memory region is not executed until said reading step from the first frame memory region is completed, and wherein if said determination step determines that the first frame rate is lower than the second frame rate, said reading step on the first frame memory region is repeated reading same frame image signal from the first frame memory region while said writing step on the second frame memory region is not executed until said writing step on the second frame memory region is completed.

6. The medium according to claim 5, wherein if said writing step on the second frame memory region is continuously executed twice or more said writing step on the second frame memory region is stopped until said reading step from the first frame memory region is completed.

\* \* \* \* \*